United States Patent [19]

Barnes

[11] Patent Number: 5,096,765

[45] Date of Patent: Mar. 17, 1992

[54] HIGH STRENGTH COMPOSITE PRODUCTS AND METHOD OF MAKING SAME

[75] Inventor: Derek Barnes, Vancouver, Canada

[73] Assignee: MacMillan Bloedel Limited, Burnaby, Canada

[21] Appl. No.: 574,179

[22] Filed: Aug. 29, 1990

[51] Int. Cl.$^5$ .............................................. B32B 9/04
[52] U.S. Cl. .................................... 428/106; 428/537.1; 428/107; 156/250; 144/332
[58] Field of Search ............... 428/105, 106, 537.1; 156/250; 144/332

[56] References Cited

U.S. PATENT DOCUMENTS

| Re. 30,636 | 6/1981 | Barnes | 428/114 |
| 4,255,477 | 3/1981 | Holman | 428/106 |
| 4,388,133 | 6/1983 | Hirao et al. | 428/106 |
| 4,569,873 | 2/1986 | Robbins | 428/106 |
| 4,610,913 | 9/1986 | Barnes | 428/215 |
| 4,751,131 | 6/1988 | Barnes | 428/215 |

*Primary Examiner*—Edith L. Buffalow

[57] ABSTRACT

Consolidated composite wood products having modulus of elasticity (MOE) equivalent to a MOE of at least 2.3 mm psi at a wood content density of 35 lbs/cu.ft is formed by a laminate of wood elements formed by slicing (veneer or strands) substantially free from surface and internal damage such as checking, splitting, tension breaks, etc. These wood elements have a thickness in the range of 0.005 to 0.1 inches, a width greater than 0.25 inches and a length measured in the grain direction of at least 8 inches aligned in the composite product with their grain direction within 10° of the longitudinal axis of the composite product.

10 Claims, 3 Drawing Sheets

HIGH STRENGTH COMPOSITE PRODUCTS AND METHOD OF MAKING SAME

FIELD OF THE INVENTION

The present invention relates to high strength composite products. More particularly the present invention relates to a high strength composite product made from wood elements substantially free of surface and internal damage and to a method of producing the composite product.

BACKGROUND OF THE PRESENT INVENTION

One of the more important properties of any structural product such as panels or lumber products is the modulus of elasticity (MOE). Obviously other properties such as modulus of rupture (MOR), tensile strength, compression strength, etc., also are factors but the MOE for many applications is the critical characteristic.

Composite wood products having high strength in particular a high MOE have been sought after for many years. The Barnes U.S. Pat. No. Re. 30,636 issued June 2, 1981 (a re-issue of U.S. Pat. No. 4,061,819 issued Dec. 6, 1977) it is believed is the first recognition that the strength of composite product could be significantly increased. This patent teaches that strength is density dependent, i.e. the higher density generally the higher the strength of the product for the same starting materials and that by changing the starting materials, particularly by increasing the length of the strands used, the strength to density ratio could be significantly improved. This system utilized wood elements in particular strands having lengths of at least 12 inches, width of 0.05 to 0.25 inches and thickness of 0.05 inches to 0.5 inches formed by slicing and then clipping. The widths and thicknesses specified in this patent are the opposite to what one would normally define as width and thickness in a waferizing operation or in producing a clipped veneer strand, i.e. normally the thickness is determined by the thickness of the veneer and the width is determined by the spacing between adjacent clips whereas with the Barnes patent the width of the strand is the thickness of the veneer and the thickness of the strand is the spacing between clips.

In any event the strength characteristics of the products produced using the Barnes teachings produced wood products having MOE's in the order of up to about 2.2 mm psi at a wood density over 35 lb/cu.ft.³ using strands 24 inches long.

The Holman U.S. Pat. No. 4,255,477 issued Mar. 10, 1981 also relates to panel or strand lumber products having improved strength. This patent teaches the use of wood elements, in particular 'boat shaped wood strips' having lengths in the order of 8 to 12 inches and according to his examples was able to successfully produce a board product having an MOE of 1.7 mm psi at a board density of about 48 (wood density probably around 44 lbs/cubic ft.) and a second product having an MOE of 1.6 mm psi at a slightly higher density. Holman attributes his 'high' strength products to the use of a variety of particularly shaped and sized elements that are substantially boat shaped in axial cross section and had lengths up to about 12 inches.

More recent patents of Barnes namely U.S. Pat. Nos. 4,610,913 and 4,751,131 issued Sept. 9, 1986 and June 14, 1988 describe a high strength panel product and a high strength lumber product respectively made from long wafers (lengths 6 to 12 inches and longer). Prior to these teachings, panels or lumber products made of wafers always employed short wafers in the order of up to 4 inches in length and the art clearly taught that extending the length of the wafer brought no significant benefits in increased strength and thus for many years, until the more recent teachings of Barnes, it was believed that if wafers were used to produce composite wood products extending the length of the wafer beyond about 3 inches was of no merit.

The latest Barnes patents teach that as the wafer length is increased the MOE to density ratio for a panel product can be increased significantly and with a wood density in the order of about 35 lbs/cubic ft. panels having MOE's in the order of 1.6 mm psi could be obtained using wafers over about 12 inches in length and that with higher wood densities and longer lengths the MOE could be further increased.

The lumber product described in U.S. Pat. No. 4,751,131 produced a lumber product having a wood density in the range of about 35-40 psi using wafers over 8 inches long having MOE's in the range of about 1.6 to 1.7 mm psi which was significantly higher than the MOE's for composite lumber products produced in the prior art.

Laminated veneer lumber is usually made by peeling veneer from a log by rotating the log and peeling a ribbon of veneer from the surface of the log. Generally the resulting veneer is eight foot long measured in the grain direction, i.e. axially of the log being turned and has a thickness in the order of about 0.1 inches. A laminated veneer lumber is produced by laying up a plurality of layers of such veneer with the grain extending substantially parallel on each of the layers and securing the layers together under heat and pressure using an adhesive such as a phenol formaldehyde. The veneer sheets, when they are peeled, generally have checks (lathe checks) extending in the grain direction. These checks are formed by the peeling operating itself.

Laminated veneer products made as above described generally have MOE's up to about 2.1 mm psi at wood densities in the range of about 35 lbs/cubic foot. Repairing of the lathe checks by addition of extra resin has been attempted but no one has reported that this contributed significantly to increasing the MOE of the laminated veneer product made from such repaired veneers.

BRIEF DESCRIPTION OF THE PRESENT INVENTION

It is an object of the present invention to provide a composite wood product having an MOE of at least 2.3 mm psi at a wood density of 35 lbs/cubic foot and a method of producing such a product.

The present invention is based on the finding that if the wood elements, (i.e. the veneer or wafers or strands) used to produce the wood product are cut in a manner to substantially eliminate surface and internal damage, the stiffness of the resultant wood composite will be increased significantly and that by proper sizing and alignment of the wood element composite products having MOE's equivalent to an MOE of at least 2.3 mm psi at a wood density of 35 lbs/cubic foot could consistently be produced.

Broadly the present invention relates to a consolidated composite wood product having modulus of elasticity (MOE) equivalent to a MOE of at least 2.3 mm psi at a wood content density of 35 lbs/cubic foot, comprising wood elements formed by slicing wood blocks having the grain of the wood substantially parallel to the longitudinal axis of the block with a knife having a cutting edge extending substantially parallel to the grain, and oriented to be substantially transverse to the axis of the block or substantially parallel to the axis of the block (within 10 degrees of parallel or perpendicular to the block) during the cutting, said elements having a thickness in the range of 0.005 to 0.1 inches (preferably 0.01 to 0.05 inches) and a length of at least 8 inches, said wood elements having their grain substantially parallel to their longitudinal axis and having their said surfaces formed by cutting by said cutting edge and substantially free from said surface and internal damage, said wood elements being arranged with their longitudinal axes aligned within ±10 degrees of the longitudinal axis of said composite wood product and consolidated into said consolidated composite product having an MOE equivalent to a composite wood product having a MOE of at least 2.3 mm psi at product a wood content density of 35 lbs/cubic foot.

Preferably said longitudinal axes of said wood elements will be aligned within ±5° of said longitudinal axis of said consolidated composite wood product being produced.

BRIEF DESCRIPTION OF THE DRAWINGS

Further features, objects and advantages will be evident from the following detailed description of the preferred embodiments of the present invention taken into conjunction with the accompanying drawings in which.

DESCRIPTION OF THE PREFERRED EMBODIMENTS

It has been found that by slicing wood elements from a wood block without causing surface and internal damage to the wood elements so produced that the MOE of a consolidated composite product made from such wood elements may be significantly increased to above that of high grade solid wood.

Figure 1:
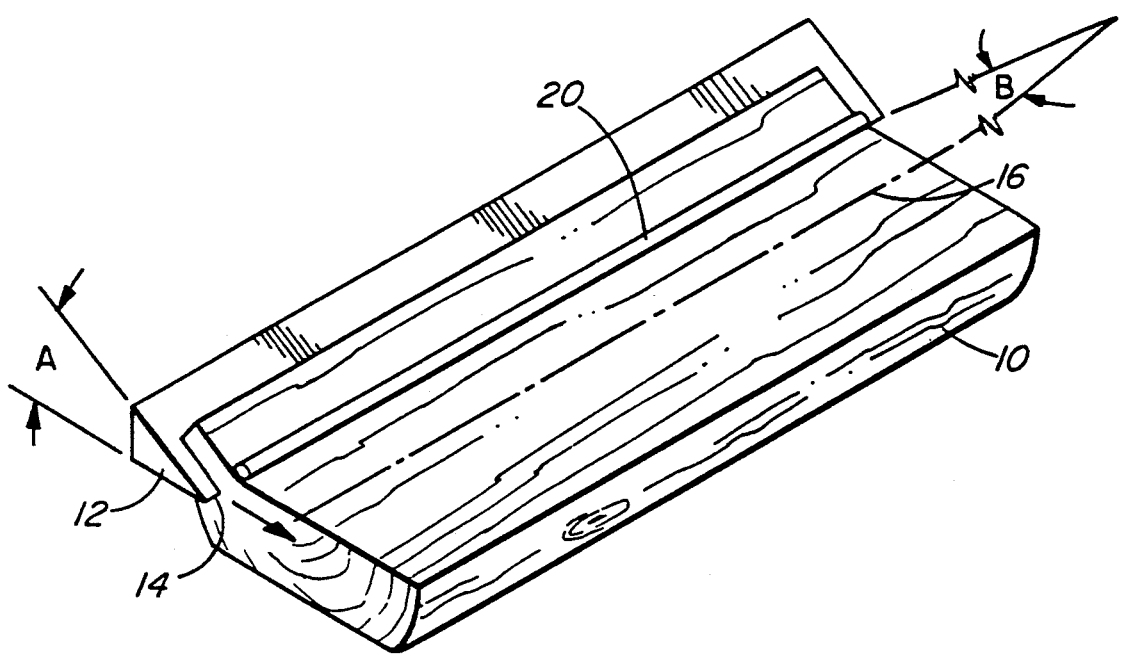
FIG. 1 is a schematic illustration of one of the cutting action of the present invention.

As shown in FIG. 1, a wood block or log 10 is being sliced by a knife 12 having a sharpening angle A forming a cutting edge 14.

The angle A designates the bevel angle of the knife 12 and angle B designates orientation of the cutting edge 14 to the longitudinal axis 16 (grain direction) of the log or block 10.

If strands are desired, the veneer must be into separated strands, it is possible to cause said separation by defecting the veneer as it is being shred using a breaker bar (not shown) positioned on the face of the cutting edge but it is preferred to slice a veneer sheet the size of the exposed face and then clip the veneer into strands if strands are required, i.e. veneer or strands.

In forming veneer by the conventional slicing process, a pressure bar or roller 20 immediately precedes the cutting knife and is used to control the cutting operation of the slicer.

The angle A preferably will be maintained quite small (preferably less than about 25°) and the knife 12 and wood will be relatively moved in a direction with the edge 14 substantially parallel to the longitudinal axis of the wood, i.e. the angle B between the edge 14 and the longitudinal axis of the wood (grain of the wood) should not exceed ±15 degrees. The thicker the veneer being sliced preferably the smaller the angle A.

Similarly, the trajectory of the blade across the face of the wood 10 should be substantially in a straight line for the best possible results however using rotating slicer wherein the arc of the wood block relative to the knife is about 3 foot radius is satisfactory.

The above description has dealt with relative movement of the cutting edge 14 and wood in a direction substantially perpendicular to the grain. It is also possible to produce a similar wood element by relatively moving the cutting edge 14 and wood block substantially axially of the block (in the direction of the grain) with the cutting blade at about ±10° to 20° to the longitudinal axis (to the grain direction) of the wood. In this case only veneer sheets are produced. These sheets may be later clipped or broken into strands as desired using a separate step applied to the separated veneer sheets.

Figure 2:
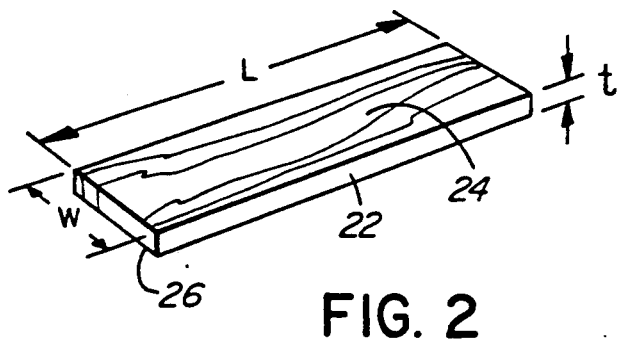
FIG. 2 shows a typical wood element formed in accordance with the present invention and used to produce the composite product of the present invention.

It has been found that wood elements such as the element 22 shown in FIG. 2 and produced by slicing as above described have their its major surfaces 24 and 26 substantially free of surface and internal defects (such as checking, splitting, tension breaks, etc.) and for the most part the elements produced demonstrate an edge grain, i.e. the grain running directly from surface 24 to surface 26 in a substantially straight line path.

Applicant has found that a veneer for use in the present invention may be produced by a conventional slicing process used commercially to produce high grade veneer for decorative purposes. Thus it is believed that any equivalent slicing action should yield a wood element suitable for the present invention.

To obtain the required strength characteristics in the composite product it is also necessary that the length L of the wood elements be at least 8 inches and preferably 12 inches or more and that the thickness not exceed 0.1 inches and preferably be less than 0.05 and may be as thin as 0.005. At very small thicknesses the cost of may exceed any advantages gained by the reduction in thickness. Preferably the average thickness of the elements will be 0.01 to 0.05 inches. The width is not as important but in any event normally will not be less than 0.25 inch. Obviously when a laminated veneer lumber product is being made size of the elements 22 will be considerably longer, probably in the order of about 8 feet and the width will correspond with the trimmed width of the face of the block from which the veneer sheet is produced by slicing.

Figure 3:
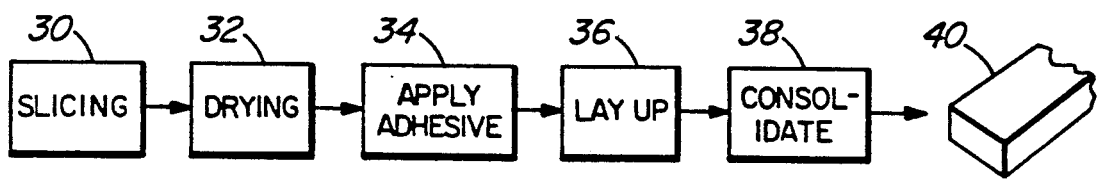
FIG. 3 is a schematic of the various steps in the typical of forming a composite product.

FIG. 3 schematically illustrates a typical sequence of process steps for producing a consolidated wood product. The wood elements 22 (veneer or strands) are first produced by the slicing action in the cutting station 30 described above. They are then dried as indicated in the station 32, adhesive applied in the station 34, a lay-up formed in the station 36 and the lay-up pressed in station 38 to produce the multi-layered consolidated composite product 40 which may be formed by laying up the sheets of veneer or layers of discrete wood strands oriented as above described, i.e. grain at less than ±10° to the longitudinal axis of the consolidated product and preferably less than 5°.

A comparison of the structural properties of composite products ½ inch thick formed using wood elements of the present invention with other wood elements is provided by Table 1 comparing MOR and MOE of products made from peeled veneers with product made from sliced veneers produced in accordance with the present invention.

TABLE I

| Mpsi | Thickness (inches) | Species | MOE MMpsi | Tensile MR Mpsi |
|---|---|---|---|---|
| Peeled 18.00 Veneers | 0.020 to 0.125 | Douglas Fir | 2.10 | 12.00 |
| Sliced 18.5 Veneers | 0.10 | Douglas Fir | 2.68 | 12.8 |
| | 0.05 | Douglas Fir | 2.72 | |
| | 0.025 | Douglas Fir | 2.91 | |
| | 0.025 | Aspen | 3.09 | |

Products made with peeled veneers made in accordance with the prior art peeling technique, having a thickness of 0.20 to 0.125, showed little difference in Tensile, MOR or MOE strengths for the samples tested regardless of veneer thickness used.

It will be noticed that the product made with sliced veneers of a thickness 0.1 inches had essentially the same Tension and MOR as the peeled veneers yet the MOE was significantly higher. The MOE of the sliced veneer product increased significantly as the thickness of the veneer was reduced.

FIGS. 4 to 7 show various strength characteristics at an equivalent wood content density of 35 lb/cu.ft.

Figure 4:
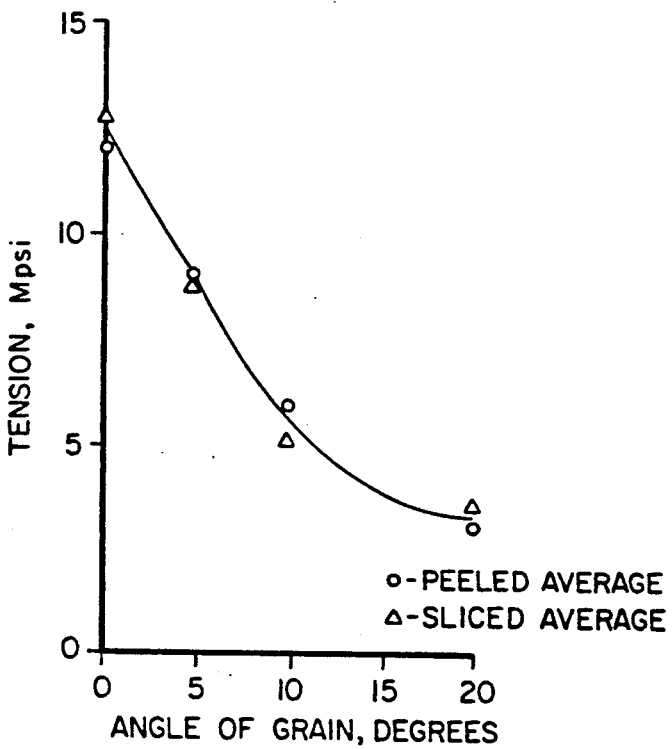
FIG. 4 is a graph indicating the tension of products made with 0.100" veneer produced by a slicing action of the present invention and product made with 0.100" standard peeled veneer showing the change in strength with change in grain angle to the longitudinal axis of the product being tested.

FIG. 4 shows the change in tensile strength of composites produced with different angles of the grain, i.e. the angle of the grain relative to the direction of stress application. This figure indicates that for a 0.1 inch veneer the manner in which the veneer was produced (i.e. sliced or peeled) made no difference in tensile strength and that in either case the tensile strength reduced dramatically with increase in angle.

Figure 5:
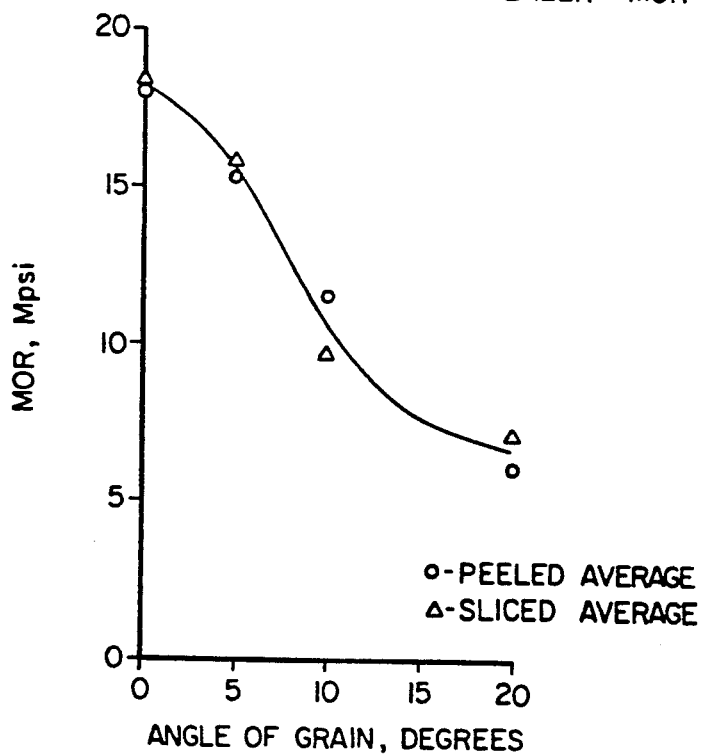
FIG. 5 is a graph similar to FIG. 6 but illustrating MOR for sliced and peeled veneers having their grains arranged at different angles to the longitudinal axis of the product being tested.

Similar results were obtained when testing the products for MOR and comparing peeled and sliced veneers of 0.1 inch thickness (see FIG. 5).

Figure 6:
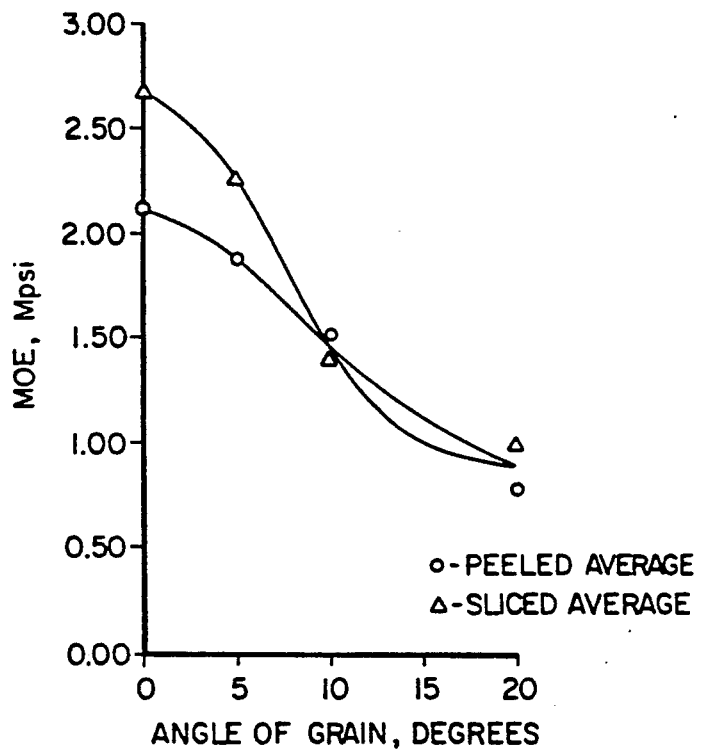
FIG. 6 is a graph of MOE for products made with 0.10" thick sliced elements made in accordance with the present invention and products made with 0.10" conventional peeled veneer showing the difference in MOE using conventional veneer and sliced veneer (or wafers) made in accordance with the present invention.

There is a major discernible difference between these products in MOE. The results plotted in FIG. 6 show that the product made with sliced veneer (0.1 inch thickness) had a significantly higher MOE than the one made with peeled veneer (0.1 inch thickness) up to a grain angle to the direction of stress applied (i.e. to the longitudinal axis of the specimen being tested) of about 5° and retained some improvement up to a grain angle of about 10°. When the grain angle exceeded 10° both products (i.e. peeled veneer or sliced veneer) were essentially the same. Thus it will be apparent that to obtain the benefits of a the present invention using wood elements substantially free of surface or internal damage orientation of the strands or veneers is extremely important and must be within 10 and most preferably within 5 degrees of the longitudinal axis of the product.

Figure 7:
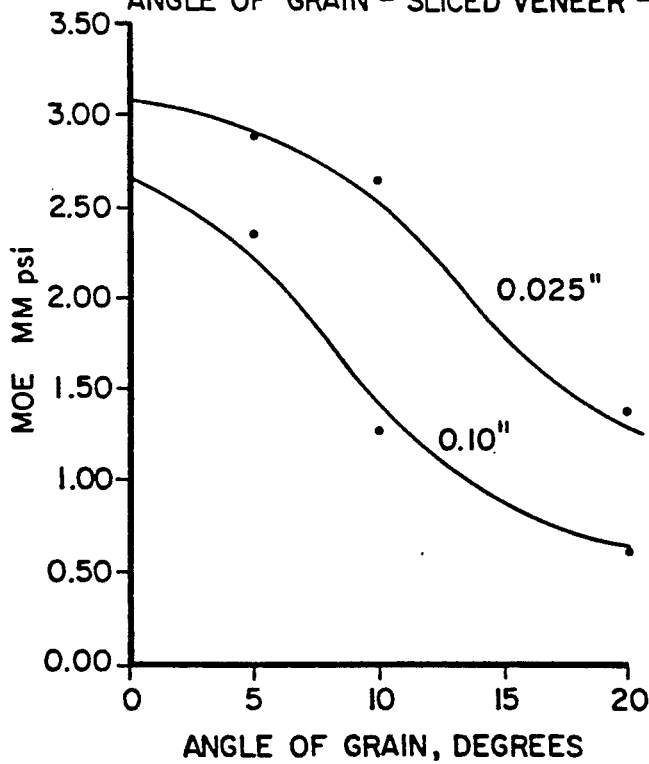
FIG. 7 is a graph of grain angle versus MOE for products made using the present invention but having different veneer and strand thickness.

FIG. 7 shows the difference in strength (MOE) obtainable by changing the thickness of the sliced veneer. It is apparent that the thinner sliced veneer, i.e. the 0.025 inch veneer had significantly higher MOE at any grain angle than the product made with 0.10 inch thick veneer. With a veneer at thicknesses of 0.1 the MOE of the product was not above 2.3 mm psi at a wood density equivalent to 35 lb/cu.ft. unless the angle of the grain was less than about 5°.

Having described the invention, modifications will be evident to those skilled in the art without departing from the spirit of the invention as defined in the appended claims.

I claim:

1. A consolidated composite wood product having modulus of elasticity (MOE) of at least 2.3 mm psi at a wood content density of 35 lbs/cubic foot, comprising wood elements formed by slicing wood blocks having the grain of the wood substantially parallel to the longitudinal axis of the block with a knife having a cutting edge extending substantially parallel to the grain, said edge being oriented to be one of substantially transverse to the axis of the block or substantially parallel to the axis of the block during said slicing, to slice said wood blocks to form said elements without significantly structurally damaging said wood elements, said elements to have an average thickness in the range of 0.005 to 0.1 inches and a length of at least 8 inches, said wood elements having their grain substantially parallel to their longitudinal axis, said wood elements being consolidated under pressure and bound together by adhesive into said consolidated composite wood products with said longitudinal axes of said wood element aligned within ±10 degrees of the longitudinal axis of said consolidated composite wood product and said consolidated composite wood product having an MOE equivalent to a composite wood product having a MOE of at least 2.3 mm psi at product a wood content density of 35 lbs/cubic foot.

2. A composite wood product as defined in claim 1 wherein said longitudinal axes of said wood elements is aligned within ±5° of said longitudinal axis of said consolidated composite wood product.

3. A composite wood product as defined in claim 1 wherein said average thickness is in the range of 0.01 to 0.05 inches.

4. A composite wood product as defined in claim 2 wherein said average thickness in the range of 0.01 to 0.05 inches.

5. A composite wood product as defined in claim 1 wherein said wood elements are veneer sheets.

6. A composite wood product as defined in claim 1 wherein said wood elements are strands.

7. A composite wood product as defined in claim 2 wherein said wood elements are veneer sheets.

8. A composite wood product as defined in claim 2 wherein said wood elements are strands.

9. A composite wood product as defined in claim 3 wherein said wood elements are veneer sheets.

10. A composite wood product as defined in claim 3 wherein said wood elements are strands.

* * * * *